Oct. 22, 1957    E. WIESENHOFER    2,810,154
FISH SKINNING TOOL
Filed Nov. 9, 1954

INVENTOR.
Eugene Wiesenhofer,
BY
Watson D. Harbaugh
Atty.

United States Patent Office 2,810,154
Patented Oct. 22, 1957

2,810,154

FISH SKINNING TOOL

Eugene Wiesenhofer, East Peoria, Ill.

Application November 9, 1954, Serial No. 467,730

3 Claims. (Cl. 17—7)

This invention relates to a type of tool especially adapted for the skinning of fish.

The skinning of fish, as a rule, is done by using a knife to first slit the skin at the point where the skinning operation is to be initiated. Generally, this is adjacent the point where the head joins the body. With the knife wielded in one hand the operator seeks to free enough of the skin to get a finger hold. With as firm a grip as thus may be obtained on a portion of the freed skin it is pulled upwardly away from the body. Where necessary to facilitate the freeing of the skin from the flesh the use of the knife is resorted to for that purpose.

With certain kinds of fish such a continued pulling may effect a satisfactory removal thereof. However, with other kinds if fish it is difficult to secure and/or maintain a sufficiently firm grip with the fingers on the slippery skin to apply the force requisite to free the skin without resorting to the use of the knife constantly to release the skin from the flesh. This is not only difficult and at times awkward, but there is always the danger of an accident and of the knife cutting the skin and resulting in the removal of only small portions of the skin at a time.

The main objects of this invention are to provide an improved form of hand tool for skinning fish; to provide a fish-skinning tool having an improved form and relative arrangement of a pair of pliers or pincher-type, pivotally-connected, crossed members; to provide an improved form of jaws for a fish skinning tool of this kind which will so firmly clamp the skin between the jaws as to practically preclude all possibility of the skin being scored, punctured, or cut at the point of its gripping and insure the removal of large sections of the skin each time; to provide an improved form of one of the jaws so as to embody a knife edge to permit ready slitting of the skin and the insertion of the jaw thereunder preparatory to manipulating the tool for the skinning operation; and to provide an improved simple form and relative arrangement of the two members for a tool of this kind as to make their manufacture very economical and the use of the tool effective in the hands of the most inexperienced person.

Figure 4:
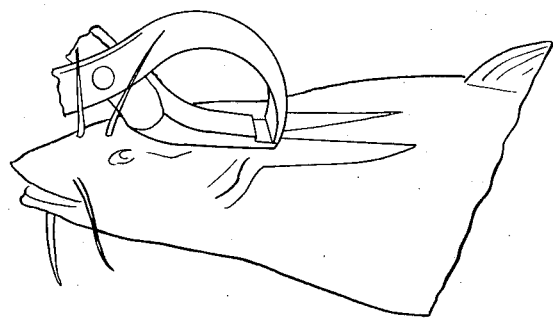
Fig. 4 is a diagrammatic perspective of the tool in use on a fish.

The essential concept of this invention involves a pair of pivoted members of plier or pincher type each with a jaw, one of which jaws is practically straight and offset on a plane parallel to the axis of the one member whereas the jaw on the other member is arched in substantially semi-circular form whereby, when in skinning-grip relationship, the terminal portions of the jaws are substantially at right angles to each other and the skin-gripping faces are substantially parallel, the one jaw having a transverse knife edge formed at the extremity thereof within the projected contour of the other.

A fish skinning tool embodying the foregoing concept comprises a pair of members 11 and 12 having their ends transversely offset from the axes of the members to form jaws 13 and 14 and hand grips 15 and 16, the members 11 and 12 being hinged together by a pivot pin 17 at their reduced intermediate section 18 and 19 so that the jaws and the hand grips swing toward and away from each other substantially in a common plane.

Figure 1:
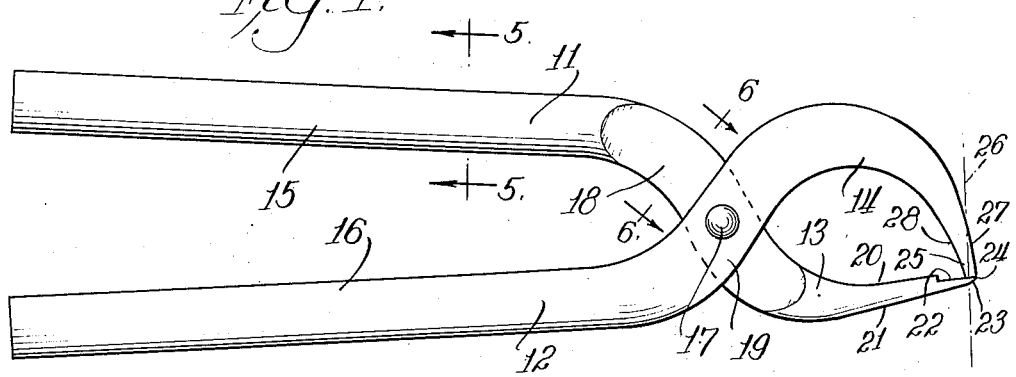
Fig. 1 is a side view of a fish skinning tool constructed in accordance with this invention.
Figure 2:
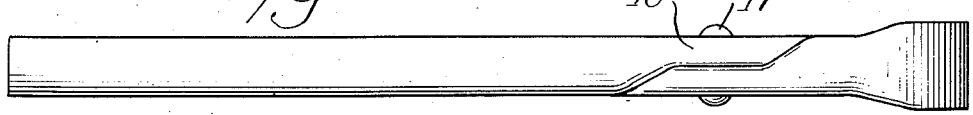
Fig. 2 is a plan view of the same.
Figure 5:
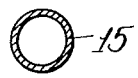
Figs. 5 and 6 are cross-sectional views, taken respectively through the hand grip and adjacent the pivotal connection of arms of a tool made of tubular rather than solid rod material.
Figure 6:
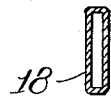

The members 11 and 12 may be formed either of solid rod or of tubular material. Figs. 1 and 2 show the tool made of solid rod material. Figs. 5 and 6 show the cross-sectional form of tubular material at the point of the hand grips 15 and 16 and at the pivotally-connected reduced sections 18 and 19.

The jaw 13 is practically straight but offset in a plane substantially parallel with the axis of its hand grip 11. Thus, when the two members are hinged together, the jaw 13 is substantially coextensive with axis of the other hand grip 16, as is most apparent from Fig. 1. Also, as is apparent from Fig. 1, outwardly of the reduced section 18 of the member 11, the jaw 13 is oppositely flattened at 20 and 21, the respective planes of the flattened upper and under sides 20 and 21 converging outwardly toward the extremity of the jaw 13. The terminal end of the flat part 20 is recessed at 22 where contact is to be made with the jaw 14. Also, the terminal end of the flat part 21 is tapered at 23 so as to form a transverse knife edge 24 at the extremity of the jaw 13.

Figure 3:
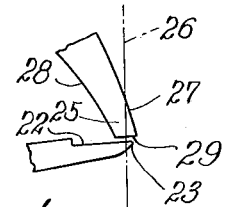
Fig. 3 is a fragmentary view showing the extremities of the skin-gripping jaws slightly separated to more clearly indicate the relationship of the skin-gripping faces of the jaws.

The jaw 14 is arched in substantially semi-circular form so that when the hingedly-connected members 11 and 12 are actuated to close the jaws the arched jaw 14 is so directly opposed to the jaw 13 that the terminal part 25 is disposed substantially at right angles to the jaw 13, as indicated by the fine dot-and-dash line 26 in the Figs. 1 and 3. The terminal portion of the jaw 14 has the opposite faces convergingly flattened at 27 and 28 and the extremity 29 of the jaw is so formed that when it is pressed against the face formed by the recess 22 the contacting faces of the jaws 13 and 14 are parallel. Hence, when the fish skin is gripped between these jaw faces 22 and 29 the skin is firmly held throughout the areas of these respective faces. Accordingly, the tool affords a powerful grip on the skin yet with no likelihood of the skin being scored, punctured, or cut at or adjacent the point of contact with the jaws 13 and 14. This facilitates a sure and ready stripping of the skin from the flesh of the fish.

In skinning a fish, this improved skinning tool is used in the following manner:

The fish is laid on a flat surface with the head toward the operator in position to allow one hand to grasp the head of the fish. The tool is held in the other hand adjacent the head of the fish as indicated in Fig. 4. The tool is first actuated to separate the jaws 13 and 14 slightly so as to permit the knife edge 24 on the jaw 13 to be pressed against the skin to cut the same and allow the terminal part of the jaw 13 to be inserted under the skin at that point.

The hand grips 15 and 16 are then firmly grasped to clamp the skin between the faces 22 and 29. The tool is pushed toward the tail of the fish with the flat under side of the jaw 13 parallel with if not actually in contact with the body of the fish. A large section, if not all, of the skin on the one side will be easily and quickly severed from the flesh with one stroke. If any small sections of skin should remain, the gripping of the near ends and pushing of the tool toward the tail will result in those sections being stripped off.

One side being skinned the fish is turned over and the operations repeated to skin that side.

I claim:

1. In a fish skinning tool, a pair of elongated, substantially straight hand grip members, each of said members having an end portion inclined outwardly from the major portion thereof and configured to contact each other in snugly abutting relationship, means for pivotally connecting each of said members at their end portions, an arched, downwardly extending jaw structure formed integrally with the lower of said members, said jaw structure defining a tip disposed substantially perpendicularly to the lowermost portion of said arched jaw and having a width in the axial direction of said hand grip members substantially greater than one-sixteenth of an inch, a second jaw structure formed in underlying relationship to said first jaw structure, said second jaw structure having a flat skid surface on its underside and defining at its outer end a shelf adapted to engage said tip in snugly abutting relationship when said hand-grip members are manually pivoted toward one another, said shelf having its outer edge tapered to provide a sharp knife edge.

2. In a fish skinning tool, a pair of elongated, substantially straight hand grip members, each of said members having an end portion inclined outwardly from the major portion thereof and configured to contact each other in snugly abutting relationship, means for pivotally connecting each of said members at their end portions, an arched, downwardly extending jaw structure formed integrally with the lower of said members, said jaw structure defining a tip disposed substantially perpendicularly to the lowermost portion of said arched jaw and having a width in the axial direction of said hand grip members substantially greater than one-sixteenth of an inch, a second jaw structure formed in underlying relationship to said first jaw structure, said second jaw structure having a flat skid surface on its underside and defining at its outer end a shaft adapted to engage said tip in snugly abutting relationship when said hand-grip members are manually pivoted toward one another, said shaft having its outer edge tapered to provide a sharp knife edge, said shelf extending substantially parallel to said skid surface.

3. In a fish skinning tool, a pair of elongated substantially straight hand grip members, each of said members having an end portion inclined outwardly from the major portion thereof and configured to contact each other in snugly abutting relationship, means for pivotally connecting each of said members at their end portions, an arched, downwardly extending jaw structure formed integrally with the lower of said members, said jaw structure defining a tip disposed substantially perpendicularly to the lowermost portion of said arched jaw and having a width in the axial direction of said hand grip members substantially greater than one-sixteenth of an inch, a second jaw structure formed in underlying relationship to said first jaw structure, said second jaw structure having a flat skid surface on its underside and defining at its outer end a shelf adapted to engage said tip in snugly abutting relationship when said hand-grip members are manually pivoted toward one another, said shelf having its outer edge tapered to provide a sharp knife edge with its upper surface substantially flat, said tapered portions being continuous with said skid surface.

References Cited in the file of this patent

UNITED STATES PATENTS

| 1,171,241 | Potter | Feb. 8, 1916 |
| 1,459,007 | Wetzig | June 19, 1923 |
| 2,654,120 | Tifft | Oct. 6, 1953 |

FOREIGN PATENTS

| 55,217 | Norway | May 13, 1935 |